(12) United States Patent
Kannankeril et al.

(10) Patent No.: US 7,018,495 B2
(45) Date of Patent: Mar. 28, 2006

(54) PROCESS FOR MAKING AND AGING HIGH STRENGTH HIGH GAS BARRIER CELLULAR CUSHIONING PRODUCT

(75) Inventors: Charles Kannankeril, North Caldwell, NJ (US); Robert O'Dowd, Wesley Hills, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 310 days.

(21) Appl. No.: 10/648,015

(22) Filed: Aug. 26, 2003

(65) Prior Publication Data

US 2004/0099986 A1    May 27, 2004

Related U.S. Application Data

(63) Continuation-in-part of application No. 10/302,004, filed on Nov. 22, 2002.

(51) Int. Cl.
*B32B 31/14*    (2006.01)

(52) U.S. Cl. .................. 156/145; 156/290; 156/291; 156/244.11; 428/500; 428/178; 428/373; 428/158; 525/88

(58) Field of Classification Search ............... 156/145
See application file for complete search history.

(56) References Cited

U.S. PATENT DOCUMENTS

| | | |
|---|---|---|
| 3,873,643 A | 3/1975 | Wu et al. |
| 4,087,587 A | 5/1978 | Shida et al. |
| 4,096,306 A | 6/1978 | Larson |
| 4,394,485 A | 7/1983 | Adur |
| 4,551,379 A | 11/1985 | Kerr |

(Continued)

FOREIGN PATENT DOCUMENTS

EP    1 338 413 A1    8/2003

(Continued)

OTHER PUBLICATIONS

Wild et al, J. Poly. Sci. Poly. Phys. Ed., vol. 20, p. 441 (1982).

(Continued)

*Primary Examiner*—Blaine Copenheaver
*Assistant Examiner*—Chris Schatz
(74) *Attorney, Agent, or Firm*—Rupert B. Hurley, Jr.

(57) ABSTRACT

An inflatable cushioning article is made by a process of extruding two multilayer films (or extruding one film which is either annular or folded over) each having (a) a seal layer, (b) a tie layer containing an anhydride modified olefin polymer containing anhydride at a level of at least 150 ppm, based on the weight of the modified olefin polymer, and (c) an oxygen barrier layer comprising crystalline polyamide, crystalline polyester, ethylene/vinyl alcohol copolymer, polyacrylonitrile, and/or crystalline polycycloolefin. Selected portions of the films are heat sealed to one another in a selected area providing a heat seal pattern which leaves inflatable chambers between the films, whereby an inflatable cellular cushioning article is produced. At some point after extrusion, at least one of the multilayer films are aged for a time and at a temperature in accordance with at least one member selected from the group consisting of: (i) 141° F. to 250° F. for a period of at least 1 second; (ii) 101° F. to 140° F. for a period of at least 10 minutes; (iii) 61° F. to 100° F. for a period of at least 1 hour; and (iv) 30° F. to 60° F. for a period of at least 1 day. After aging, the cellular cushioning article is inflated. Preferably, the article is inflated to an internal pressure of at least 1.5 psi.

27 Claims, 6 Drawing Sheets

U.S. PATENT DOCUMENTS

| | | | |
|---|---|---|---|
| 4,950,541 A * | 8/1990 | Tabor et al. | 428/373 |
| 5,206,075 A | 4/1993 | Hodgson, Jr. | |
| 5,241,031 A | 8/1993 | Mehta | |
| 5,272,236 A | 12/1993 | Lai et al. | |
| 5,278,272 A | 1/1994 | Lai et al. | |
| 5,912,070 A | 6/1999 | Miharu et al. | |
| 2002/0166788 A1 | 11/2002 | Sperry et al. | |

FOREIGN PATENT DOCUMENTS

| | | |
|---|---|---|
| WO | 90/03414 | 5/1990 |
| WO | 93/03093 | 2/1993 |
| WO | 02/26644 | 4/2002 |

OTHER PUBLICATIONS

U.S. Appl. No. 10/057,067, Sperry et al, "Apparatus and Method for Forming Inflated Chambers".

U.S. Appl. No. 09/934,732, Kannankeril et al, "Integrated Process for Making Inflatable Article".

* cited by examiner

PROCESS FOR MAKING AND AGING HIGH STRENGTH HIGH GAS BARRIER CELLULAR CUSHIONING PRODUCT

CROSS-REFERENCE TO RELATED APPLICATION

This application is a continuation-in-part of U.S. Ser. No. 10/302,004, entitled "High Strength High Gas Barrier Cellular Cushioning Product", filed Nov. 22, 2002, the entirety of which is hereby incorporated by reference thereto. To the extent that any disclosure in the '004 application may conflict with the disclosure herein, the instant specification dominates the disclosure in the '004 application.

FIELD OF THE INVENTION

The invention pertains to cellular cushioning articles, especially air cellular cushioning articles suitable for packaging end uses.

BACKGROUND OF THE INVENTION

Air cellular cushioning articles suitable for packaging applications have been in commercial use for several decades. One of the products in widespread use is Bubble-Wrap® cellular cushioning, one embodiment of which is made by using heat and vacuum to form spaced-apart, air-filled cavities in a first film and thereafter heat sealing a flat second "backing" film to the land areas (i.e., "flats") between the cavities of the first film, so that air is entrapped in the formed cavities making up the individualized cells. The resulting air-cellular cushioning product comprises discrete closed bubbles. If any one bubble bursts, no other bubble necessarily deflates. One significant disadvantage of BubbleWrap® cellular cushioning product is that shipping costs are high per unit weight of product because the product density is low, i.e., the shipping of such products is mostly shipping air.

Bubble Wrap® cellular cushioning has been made from multilayer films having outer seal layers, a central gas barrier layer, and a tie layer between each of the seal layers and the barrier layer. The tie layer has been made from an anhydride modified low density polyethylene, with an anhydride content of about 141 parts per million, based on the weight of the anhydride modified low density polyethylene in the tie layer.

Although Bubble Wrap® cushioning products have not been displaced by inflatable flexible cushioning articles, in the past there have been a number of commercialized air-cellular cushioning products for packaging which have been designed to be inflated by the end user, i.e., inflated and sealed shut immediately before end use by the packager. These products offer the advantage of being shippable before inflation, providing for much more efficient transport and storage before use, as any given volume within a truck or warehouse can hold over thirty times as much product if it is uninflated rather than shipped to the packager while inflated. One of these products has been made from the same multilayer film used for Bubble Wrap® cellular cushioning.

These "inflatable" cellular packaging products differ from BubbleWrap® cellular cushioning in a number of ways. One notable difference between inflatable cushioning products and BubbleWrap® cellular cushioning is that the inflatable cushioning articles have a plurality of chambers extending from a fill zone, with each of the chambers containing a series of interconnected inflatable bubbles (i.e., "cells"), with each series of bubbles extending transversely across the web. Air within one of the cells of a particular series can freely move within other cells of the same series. More particularly, if a load is placed on one of the bubbles in the series, the bubble can partially or fully collapse as air is displaced from within the bubble, with the air moving to the other bubbles in the series. The displacement of air from one bubble to others can be detrimental to a packaged product because the product may no longer be receiving adequate cushioning protection. It would be desirable to reduce or eliminate this "bottoming out" tendency in an inflatable air cellular product.

SUMMARY OF THE INVENTION

The present invention pertains to an inflatable flexible cellular cushioning article made from a film or films which are sealed together in a pattern which provides a plurality of inflatable chambers, with each chamber having a plurality of inflatable cells connected to one another in series. The films which are sealed together are flexible multilayer films having a gas barrier layer, a seal layer, and a tie layer adhering the gas barrier layer to the seal layer.

Although an inflatable cushioning article made from the same films used for Bubble Wrap® cellular cushioning performed well when inflated to the normal pressure of 1 psi, when the internal pressure was elevated to a higher-than-normal 3 psi, it was discovered that this inflated article performed satisfactorily under many conditions of use, but did not perform satisfactorily when subjected to somewhat harsh conditions of use, such as in a 140° F. environment for several hours. That is, when used under such harsh conditions, it was discovered that the multilayer film delaminated due to adhesive and/or cohesive failure of the tie layers. However, the higher-than-normal 3 psi internal pressure provides the inflatable article with a reduced tendency of any one cell to "bottom out" when subjected to load.

It has been discovered that the multilayer film can be provided with a tie layer strong enough to allow the multilayer barrier film to be used in a 3 psi inflated cellular cushioning article without delamination under harsh conditions of use. The substitution of the stronger tie layer in place of the weaker tie layer previously used has been found to reduce or eliminate film delamination when the article is subjected to harsh conditions, such as high temperature (e.g., 140° F.) and/or low external pressure (e.g., 13.7 inches of mercury vacuum). For example, it has been discovered that by making the tie layers from a maleic anhydride modified linear low density polyethylene having a maleic anhydride content of about 190 parts per million (versus the maleic anhydride modified low density polyethylene having a maleic anhydride content of 141 parts per million previously used), the inflatable article is capable of withstanding the higher-than-normal 3 psi internal pressure without delamination and/or film rupture, even when subjected to harsh conditions, such as 140° F. for four hours. Moreover, the inflatable article made using this film was also found to provide the article with the capability of withstanding the 3 psi internal pressure in combination with low ambient pressure as can be found on mountain tops and in airplane cargo compartments, without film delamination, seal failure, or film rupture.

It has also been discovered that if a crystalline gas barrier polymer (e.g., a crystalline nylon, such as nylon 6, also known as polyamide-6, and polycaprolactam) is present in a layer of the films which are sealed together to form the inflatable article, and the resulting inflatable article is subjected to the burst pressure test immediately after the films are extruded and sealed together to form the inflatable article in a continuous, integrated process, the inflatable article has a lower burst pressure compared with an otherwise identical inflatable article which has been aged for a period of time before being subjected to the burst pressure test.

More particularly, it has been discovered that during aging, film containing the crystalline barrier polymer becomes stronger, which causes the burst pressure of the resulting inflatable article to be higher. A gas barrier layer containing polyamide-6, a crystalline polyamide, is desirable because after aging it results in a stronger film for inflation, on a weight-of-polymer basis. This stronger film has been found to permit higher inflation pressure, on a per-film-weight basis. In addition, within limits, the higher the temperature of the film during aging, the shorter the aging period needs to be to accomplish the desired crystallization.

As a first aspect, the present invention is directed to a process for making an inflated cellular cushioning article. The process comprises extruding first and second multilayer films, heat sealing the first film to the second film to form an inflatable article, and aging the films before inflating the article. The multilayer films each comprise a seal layer, a tie layer, and a gas barrier layer. The tie layer comprises olefin polymer containing anhydride at a level of at least 150 ppm, based on the weight of the modified olefin polymer. The gas barrier layer comprises at least one member selected from the group consisting of crystalline polyamide, crystalline polyester, ethylene/vinyl alcohol copolymer, polyacrylonitrile, and crystalline polycycloolefin.

The aging of the film(s) can be carried out either before the films are heat sealed to one another, or after the films are heat sealed to one another. At least one of the films is to be aged before the article is inflated, and preferably all of the film in the article is aged before inflation. The aging is carried out for a time and at a temperature in accordance with at least one member selected from the group consisting of: (i) 141° F. to 250° F. for a period of at least 1 second; (ii) 101° F. to 140° F. for a period of at least 10 minutes; (iii) 61° F. to 100° F. for a period of at least 1 hour; and (iv) 30° F. to 60° F. for a period of at least 1 day.

More preferably, the inflatable cellular cushioning article is aged for a time and at a temperature in accordance with at least one member selected from the group consisting of: (i) 141° F. to 250° F. for a period of from 1 second to 1 day; (ii) 101° F. to 140° F. for a period of from 10 minutes to 10 days; (iii) 61° F. to 100° F. for a period of from 1 hour to 100 days; and (iv) 30° F. to 60° F. for a period of from 1 day to 1 year. More preferably, in the inflatable cellular cushioning article is aged for a time and at a temperature in accordance with at least one member selected from the group consisting of: (i) 141° F. to 250° F. for a period of from 1 second to 2 hours; (ii) 101° F. to 140° F. for a period of from 30 minutes to 6 days; (iii) 61° F. to 100° F. for a period of from 1 day to 10 days; and (iv) 30° F. to 60° F. for a period of from 3 days to 60 days.

After aging, the cellular cushioning article is inflated to an internal pressure of at least 1.5 psi (preferably from 1.5 to 10 psi, more preferably from 1.5 to 5 psi, more preferably 2 to 4 psi, more preferably from 2 to 3.5 psi, more preferably about 3 psi), with the internal pressure being measured relative to an external environment at 23° C. and 1 atmosphere ambient pressure.

Preferably, the gas barrier layer of the first multilayer film comprises crystalline gas barrier polymer in an amount of from 3 to 30 percent (more preferably 5 to 20 percent, more preferably 8 to 15 percent), based on total film weight, and the gas barrier layer of the second multilayer film also comprises crystalline gas barrier polymer in an amount of from 3 to 30 percent (more preferably 5 to 20 percent, more preferably 8 to 15 percent), based on total film weight.

Preferably, the tie layer of the first multilayer film comprises an anhydride modified ethylene/$C_{4-10}$ alpha-olefin copolymer ($C_{4-10}$=$C_4$–$C_{10}$=$C_4$, $C_5$, $C_6$, $C_7$, $C_8$, $C_9$, and/or $C_{10}$), and the tie layer of the second multilayer film comprises an anhydride modified ethylene/$C_{4-10}$ alpha-olefin copolymer. Preferably, at least one of the tie layers comprises an anhydride modified ethylene/$C_{4-8}$ copolymer having an anhydride content of at least 160 ppm as determined by pyrolysis GCMS. Preferably, the anhydride-modified polyolefin comprises anhydride modified linear low density polyethylene having an anhydride content of at least 180 ppm as determined by pyrolysis GCMS.

Preferably, the seal layer of the first multilayer film comprises at least one member selected from the group consisting homogeneous ethylene/alpha-olefin copolymer, very low density polyethylene, low density polyethylene, and linear low density polyethylene, and the seal layer of the second multilayer film comprises at least one member selected from the group consisting homogeneous ethylene/alpha-olefin copolymer, very low density polyethylene, low density polyethylene, and linear low density polyethylene.

Preferably, the first multilayer film has first and second outer layers, a central gas barrier layer, a first tie layer between the first outer layer and the gas barrier layer, and a second tie layer between the gas barrier layer and the second outer layer. Preferably, the second multilayer film has first and second outer layers, a central gas barrier layer, a first tie layer between the first outer layer and the gas barrier layer, and a second tie layer between the gas barrier layer and the second outer layer. Preferably, the first and second outer layers of the first multilayer film have the same layer thickness and have the same polymeric composition, and the first and second tie layers of the first film have the same layer thickness and the same polymeric composition. Preferably, the first and second outer layers of the second film have the same layer thickness and have the same polymeric composition, and the first and second tie layers of the second film have the same layer thickness and the same polymeric composition.

Preferably, the first film has a thickness of from 1 mil to 2 mils and the second film has a thickness of from 1 mil to 2 mils.

Preferably, the first and second multilayer films are sealed together to form both the chambers and an inflation manifold, with the inflation manifold extending along a machine direction of the inflatable cushioning article.

Preferably, the chambers extend transversely from an open skirt which extends along a machine direction. Preferably, each chamber comprises from 3 to 40 cells. Preferably, each cell has a major uninflated axis having a length of from 0.5 inch to 2.5 inches.

As a second aspect, the present invention is directed to a process for making an inflated cellular cushioning article, comprising: (a) extruding first and second multilayer films as in the first aspect of the present invention, (b) heating and sealing selected portions of at least one of the first multilayer film and the second multilayer film to make an inflatable cellular cushioning article as in the first aspect of the present invention, and (c) aging the inflatable cellular cushioning article for a time and at a temperature so that the inflatable cellular cushioning article has a burst strength after aging which is at least 5 percent higher than the burst strength of the article before aging. Preferably, the inflatable cellular cushioning article has a burst strength immediately after aging which is at least 10 percent higher than the burst strength of the article immediately before. More preferably, the inflatable cellular cushioning article has a burst strength immediately after aging which is at least 15 percent higher than the burst strength of the article immediately before aging.

As a third aspect, the present invention is directed to a process for making an inflated cellular cushioning article, comprising: (a) extruding a multilayer film having an outer heat seal layer, a tie layer, and a gas barrier layer comprising at least one member selected from the group consisting of crystalline polyamide, crystalline polyester, and ethylene/vinyl alcohol copolymer, wherein the tie layer comprises an anhydride modified olefin polymer containing anhydride at a level of at least 150 ppm, based on the weight of the modified olefin polymer, the first film being folded over so that a first portion of the multilayer film overlaps a second portion of the multilayer film; (b) heating selected portions of the multilayer film to heat seal the first portion of the multilayer film to the second portion of the multilayer film in a selected area which provides a heat seal pattern which leaves inflatable chambers between the first film and the second film, whereby an inflatable cellular cushioning article is produced; (c) aging the multilayer film in accordance with the first aspect of the present invention, and (d) inflating the cellular cushioning article after aging. In one embodiment, the film is extruded from an annular die, placed in lay-flat configuration, and slit along one or two edges to form the "folded-over" film. In another embodiment, the film is extruded from a slot die an is folded over (preferably center-folded), and optionally slit along the crease of the fold.

Unless inapplicable thereto or inconsistent therewith, the above-described preferred features for each of the above aspects of the invention apply to all of the other above-describe aspects of the invention.

DETAILED DESCRIPTION OF THE INVENTION

As used herein, the phrase "heat seal" refers to any seal of a first region of a film surface to a second region of a film surface, wherein the seal is formed by heating the regions to at least their respective seal initiation temperatures. Heat sealing can be performed by any one or more of a wide variety of manners, preferably sealing is carried out by contacting the films with a heated drum to produce a heat seal, as described below. The term "seal", as used herein, is generic in that it includes adhesion of a film adhered to itself with an adhesive, or films adhered to one another with an adhesive. However, the various layers of a multilayer coextruded film are not considered to be "sealed" to one another because the term "seal", as used herein, refers to adhering less than the entire film surfaces to one another, i.e., leaving an unsealed region.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith. Preferably, such modified polymers have the anhydride functionality grafted on or polymerized therewith, as opposed to merely blended therewith.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using linear homogeneous polymers are disclosed in U.S. Pat. No. 5,206,075, U.S. Pat. No. 5,241,031, and PCT International Application WO 93/03093, each of which is hereby incorporated by reference thereto, in its entirety. Still another genus of homogeneous ethylene/alpha-olefin copolymers are the "substantially linear" homogeneous copolymers, also referred to as "long chain branched" homogeneous copolymers, disclosed in U.S. Pat. No. 5,272,236, to LAI, et. al., and U.S. Pat. No. 5,278,272, to LAI, et. al., both of which are hereby incorporated by reference thereto, in their respective entireties. Each of these patents disclose substantially linear homogeneous long chain branched ethylene/alpha-olefin copolymers produced and marketed by The Dow Chemical Company.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer of a multilayer film which is closest to the gas in the chambers after inflation, relative to the other layers of the multilayer film. The "inside surface" of the film is the surface in contact with the gas in the chambers after inflation.

As used herein, the phrase "outside layer" refers to the outer layer of a multilayer film which is furthest to the gas in the chambers after inflation, relative to the other layers of the multilayer film. The "outside surface" of the film is the surface of the film which is the furthest from the gas in the chambers after inflation.

As used herein, the term "adhered" is inclusive of films which are directly adhered to one another using a heat seal or other means, as well as films which are adhered to one another using an adhesive which is between the two films.

As used herein, the phrase "failure pressure" refers to that pressure at which the inflatable article "fails" when inflated in accordance with the Burst Pressure Test described with the examples below. The article "fails" if either film bursts, or exhibits seal failure or delamination which is immediately apparent to the unaided eye (i.e., not including trace seal failure or trace delamination). The failure pressure is determined by inflating the article while the article is in an environment of 1 atmosphere ambient pressure and 25° C. ambient temperature.

Figure 1:
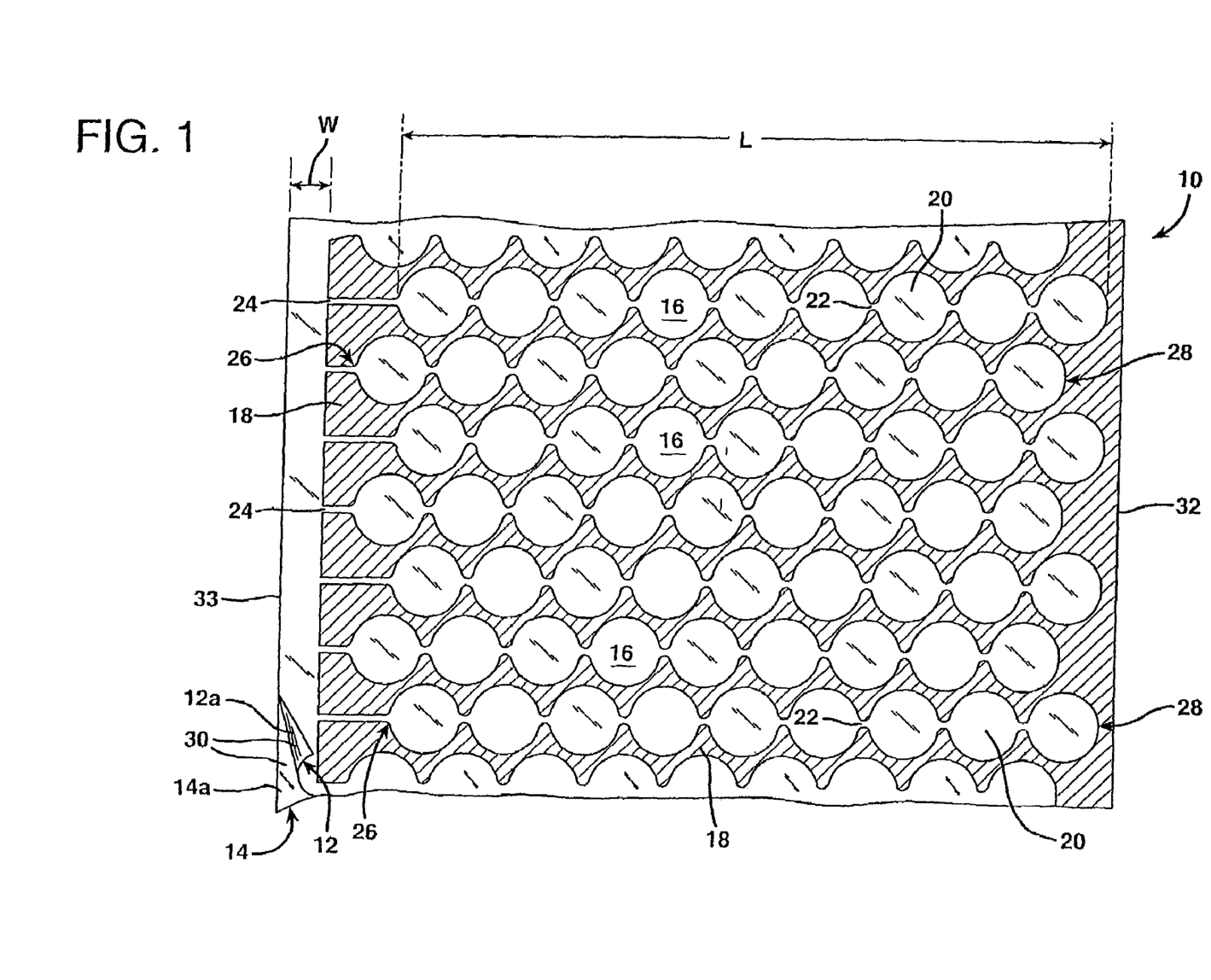
FIG. 1 is a lay-flat view of a preferred inflatable article in accordance with the present invention.

Referring to FIG. 1, there is shown an inflatable article 10 in accordance with the present invention, comprising two films 12 and 14 having respective inner surfaces 12a and 14a sealed to each other in a pattern defining a series of inflatable chambers 16 of predetermined length "L." Length L may be substantially the same for each of the chambers 16, with adjacent chambers being off-set from one another as shown in order to arrange the chambers in close proximity to one another. Films 12 and 14 are sealed to each other in a pattern of seals 18, leaving unsealed areas which define the inflatable chambers 16 such that each of the chambers has at least one change in width over their length L. That is, seals 18 may be patterned to provide in each chamber 16 a series of sections 20 of relatively large width in fluid communication with the other cells of the chamber via relatively narrow passageways 22. When inflated, sections 20 may provide essentially spherical bubbles in inflatable article 10 by symmetrical outward movement of those sections of films 12 and 14 comprising the walls of sections 20. This will generally occur when films 12 and 14 are identical in thickness, flexibility, and elasticity. Films 12 and 14 may, however, be of different thickness, flexibility or elasticity such that inflation will result in different displacement of films 12 and 14, thereby providing hemispherical or asymmetrical bubbles.

Seals 18 are also patterned to provide inflation ports 24, which are located at proximal end 26 of each of the inflatable chambers 16 in order to provide access to each chamber so that the chambers may be inflated. Opposite to proximal end 26 of each chamber is closed distal end 28. As shown, seals 18 at proximal end 26 are intermittent, with inflation ports 24 being formed therebetween. Preferably, inflation ports 24 are narrower in width than inflatable sections 20 of relatively large width, in order to minimize the size of the seal required to close off each chamber 16 after inflation thereof.

Inflatable article 10 further includes a pair of longitudinal flanges 30, which are formed by a portion of each of films 12 and 14 that extend beyond inflation ports 24 and intermittent seals 18. In the embodiment shown in FIG. 1, flanges 30 extend out equally beyond ports 24 and seals 18. The flanges accordingly have equivalent widths, shown as width "W." Flanges 30, in conjunction with ports 24 and seals 18, constitute an open inflation zone in inflatable article 10 that is advantageously configured to provide rapid and reliable inflation of chambers 16. The inner surfaces of flanges 30 can be brought into close slidable contact with outwardly facing surfaces of an appropriately configured nozzle or other inflation means so as to provide a partially closed inflation zone which promotes efficient and reliable sequential inflation of chambers 16 without restricting the movement of the web or inflation nozzle that is required to effect this sequential inflation. Flanges 30 are preferably at least ¼ inch in width and, more preferably, at least ½ inch in width. The flanges may have different widths, but it is generally preferred that they are equal in width, as shown in FIG. 1. A preferred apparatus and method for effecting inflation and sealing of the chambers is disclosed in U.S. Ser. No. 10/057,067, to Sperry et. al., entitled "APPARATUS AND METHOD FOR FORMING INFLATED CHAMBERS", which is hereby incorporated, in its entirety, by reference thereto.

Preferably, the seal pattern of seals 18 provides uninflatable planar regions between chambers 16. These planar regions serve as flexible junctions that may advantageously be used to bend or conform the inflated article about a product in order to provide optimal cushioning protection. In another embodiment, the seal pattern can comprise relatively narrow seals that do not provide planar regions. These seals serve as the common boundary between adjacent chambers. Such a seal pattern is shown for example in U.S. Pat. No. 4,551,379, the disclosure of which is incorporated herein by reference. The seals 18 may be heat seals between the inner surfaces of the films 12 and 14. Alternatively, films 12 and 14 may be adhesively bonded to each other. Heat seals are preferred and, for brevity, the term "heat seal" is generally used hereinafter. This term should be understood, however, to include the formation of seals 18 by adhesion of films 12 and 14 as well as by heat sealing. Multilayer films 12 and 14 comprise a thermoplastic heat sealable polymer on their inner surface such that, after superposition of films 12 and 14, inflatable article 10 can be formed by passing the superposed sheets over a sealing roller having heated raised land areas that correspond in shape to the desired pattern of seals 18. The sealing roller applies heat and forms seals 18 between films 12 and 14 in the desired pattern, and thereby also forms chambers 16 with a desired shape. The sealing pattern on the sealing roller also provides intermittent seals at proximal end 26, thus forming inflation ports 24 and also effectively resulting in the formation of flanges 30. Further details concerning methods making inflatable article 10 are disclosed below and are also set forth in commonly-assigned, copending patent application Ser. No. 09/934,732 entitled INTEGRATED PROCESS FOR MAKING INFLATABLE ARTICLE (Kannankeril et al.), filed on Aug. 22, 2001, the entire disclosure of which is hereby incorporated herein by reference, as well as copending patent application Serial No. PCT/US02/26644 entitled PROCESS FOR MAKING INFLATABLE ARTICLE (Kannankeril et al.), filed on Aug. 22, 2002, the entire disclosure of which is also hereby incorporated herein by reference.

The heat sealability of films 12 and 14 is provided by providing films 12 and 14 as multilayer films, each contacting the other with an outer film layer comprising a heat sealable polymer. In this manner inflation ports 24 are can be closed by heat sealing means after inflation of a corresponding chamber.

Films 12 and 14 are initially separate films that are brought into superposition and sealed, or they may be formed by folding a single sheet onto itself with the heat sealable surface facing inward. The longitudinal edge opposite from flanges 30, shown as edge 32 in FIG. 1, is closed. Closed edge 32 may be formed in the article as a result of folding a single sheet to form sheets 12 and 14, whereby the fold constitutes edge 32, or by sealing separate films 12 and 14 in the vicinity of the longitudinal edge as part of the pattern of seals 18. Although this edge is shown as closed in FIG. 1, in other embodiments of the article of this invention this edge may be open and comprise a pair of flanges similar to flanges 30 to provide a second open inflation zone for inflating a second series of inflatable chambers or for inflation of the chambers from both ends. Optionally, the unsealed portion could further include a passageway in the machine direction which serves as a manifold, i.e. connecting each of the passageways along an edge of the article. This can permit faster inflation of the article.

The films used to make the inflatable cellular cushioning article of the present invention are multilayer films having a seal layer, a gas barrier layer, and a tie layer between the seal layer and the gas barrier layer. The seal layers can comprise any heat sealable polymer, including polyolefin, polyamide, polyester, and polyvinyl chloride, and ionomer resin. Preferably, the seal layers contain a polymer having a major DSC peak of less than 105° C., or an ethylene/vinyl acetate copolymer having a melt point below 80° C. Preferred polymers for use in the seal layers include olefin homopolymers and copolymers, particularly ethylene/alpha-olefin copolymer, particularly homogeneous ethylene/alpha-olefin copolymer, linear homogeneous ethylene/alpha-olefin copolymer, homogeneous ethylene/alpha-olefin copolymer having long chain branching, and ionomer resin. Particularly preferred sealant polymers include homogeneous ethylene/alpha-olefin copolymer such as a long chain branched homogeneous ethylene/alpha-olefin copolymer, e.g., AFFINITY® substantially linear homogeneous ethylene/alpha-olefin copolymer manufactured by The Dow Chemical Company, or EXACT® linear homogeneous product manufactured by the Exxon Chemical Company. Ethylene/hexene and ethylene/octene copolymers are particularly preferred.

Although the inflatable article is made by sealing two outer film layers to one another, if the film cross-section is symmetrical with respect to layer composition, as is preferred, both outer layers are herein referred to as "seal layers", even though only one of the layers is not heat sealed to the other film making up the inflatable article. Because the seal layers make up the majority of the overall film weight, the seal layers are present for more purposes than just sealing. The seal layers provide much of the strength, bulk, abuse, abrasion, and impact strength properties for the inflatable article. Preferably the cross section of the multilayer film is symmetrical with respect to layer arrangement, layer thickness, and layer composition.

The gas barrier layer provides the multilayer film with the property of being relatively impervious to atmospheric gases. This provides the inflated cushioning product with a longer life, as the gas barrier layer allows the inflated cushioning article to retain gas in the cells for a longer period of time. This is important because without a gas barrier layer, the cushioning product under load can exhibit substantial loss of fluid, i.e., "creep", in four to seven days, as discussed in detail below. Suitable resins for use in the gas barrier layer include crystalline polyamide, crystalline polyester, ethylene/vinyl alcohol copolymer, polyacrylonitrile, and crystalline polycycloolefin. The crystalline polymer in the gas barrier layer includes crystalline polyamides, such as polyamide 6, polyamide 66, polyamide 9, polyamide 10, polyamide 11, polyamide 12, polyamide 69, polyamide 610, polyamide 612, and copolymers thereof. Crystalline polyesters include polyethylene terephthalate and polyethylene naphthalene, and polyalkylene carbonate. Saponified ethylene/vinyl acetate copolymer is commonly referred to as ethylene/vinyl alcohol copolymer (frequently referred to as EVOH), and is a crystalline copolymer suitable for use in the gas barrier layer. Crystalline cycloolefin polymers, can make suitable gas barrier layers. Ticona is a manufacturer of such polycycloolefins. A particularly preferred gas barrier layer is made from 100% CAPLON® B100WP polyamide 6 having a viscosity of FAV=100 (i.e., FAV=formic acid viscosity), obtained from Allied Chemical.

As used herein, the phrase "tie layer" refers to any internal layer having the primary purpose of adhering two layers to one another. A tie layer contains a polymer capable of covalent bonding to polar polymers such as polyamide and ethylene/vinyl alcohol copolymer. In the present invention, the tie layer serves to adhere the seal layer to the gas barrier layer. The tie layer can comprise any polymer having a polar group thereon (particularly a carbonyl group), or any other polymer which provides sufficient interlayer adhesion to adjacent layers which comprise polymers which do not adequately adhere to one another. Such polymers include olefin/unsaturated ester copolymer, olefin/unsaturated acid copolymer, and anhydride modified olefin polymers and copolymers, e.g., in which the anhydride is grafted onto the olefin polymer or copolymer. More particularly, polymers for use in tie layers include anhydride modified polyolefin, anhydride modified ethylene/alpha-olefin copolymer, ethylene/vinyl acetate copolymer, ethylene/butylacrylate copolymer, ethylene/methyl methacrylate copolymer, ethylene/acrylic acid copolymer, ethylene/methacrylic acid copolymer, and polyurethane. Modified polymers suitable for use as tie layers are described in U.S. Pat. No. 3,873,643, to Wu et al, entitled "Graft Copolymers of Polyolefins and Cyclic acid and acid anhydride monomers"; U.S. Pat. No. 4,087,587, to Shida, et al, entitled "Adhesive Blends"; and U.S. Pat. No. 4,394,485, to Adur, entitled "Four Component Adhesive Blends and Composite Structures", each of which are hereby incorporated, in their entirety, by reference thereto.

Preferred polymers for use in the tie layer include olefin polymers which are modified (e.g., grafted) with one or more monomers such as acrylic acid, methacrylic acid, fumaric acid, maleic acid, maleic anhydride, 4-methyl cyclohex-4-ene-1,2-dicarboxylic acid anhydride, bicyclo (2.2.2)oct-5-ene-2,3-dicarboxylic acid anhydride, 1,2,3,4,5, 8,9,10-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophthalic anhydride, x-methylbicyclo(2.2.1) hept-5-ene-2,3-dicarboxylic acid anhydride, x-methylnorbom-5-ene-2,3-dicarboxylic acid anhydride, norbom-5-ene-2,3-dicarboxylic acid anhydride, Nadic anhydride, methyl Nadic anhydride, Himic anhydride, methyl Himic anhydride and other fused ring monomers, as known to those of skill in the art.

In the inflatable cellular cushioning article of the present invention, the tie layer provides a high level of adhesive and cohesive strength in order to prevent the multilayer film from delaminating when the article is inflated to an internal pressure of 3 psi under standard conditions (i.e., 25° C. and 1 atmosphere pressure), and thereafter subjected to harsh conditions, for example, 140° F. for 4 hours. It has been found that not just any tie layer polymer is capable of providing a level of adhesive and cohesive strength adequate to provide the 3 psi inflated article with the desired performance properties when subjected to harsh conditions.

More particularly, it has been found that a tie layer made of 100 percent anhydride grafted low density polyethylene having an anhydride content of 141 parts per million based on resin weight (as measured by pyrolysis GC-MS) did not exhibit a level of adhesive and/or cohesive strength to prevent the article, when inflated to 3 psi, from delaminating both adhesively and cohesively. However, a tie layer made of 100 percent anhydride grafted linear low density polyethylene having an anhydride content of 190 parts per million based on resin weight, provided adequate adhesive and cohesive strength to prevent delamination under harsh conditions. Accordingly, it is believed that a tie layer made from an anhydride grafted polyolefin having anhydride content of at least 160 parts per million, based on resin weight, will provide a desired level of adhesive and cohesive strength to prevent film delamination in an inflated cellular cushioning article having an internal pressure of 3 psi, when the article is subjected to harsh conditions such as 140° F. for 4 hours, or a reduced external pressure of 0.542 atmospheres for 5 minutes. Preferably, the modified polyolefin is selected from modified LLDPE, modified LDPE, modified VLDPE, and modified homogeneous ethylene/alpha-olefin copolymer. Preferably, the polyolefin is anhydride modified, preferably having an anhydride content of at least 150 ppm, more preferably 155 ppm, more preferably 160 ppm more preferably 165 ppm more preferably 170 ppm more preferably 175 ppm more preferably 180 ppm more preferably 185 ppm more preferably 190 ppm, based on resin weight. Preferably, the modified polyolefin has an anhydride content of from 150 to 1000 ppm, more preferably from 160 to 500 ppm, more preferably from 165 to 300 ppm, more preferably from 170 to 250 ppm, more preferably from 175 to 220 ppm, more preferably from 180 to 210 ppm, more preferably from 185 to 200 ppm, based on resin weight.

Determination of Anhydride Content in Resins

Anhydride Content was determined for two tie layer resins used to make inflatable articles in the examples set forth below. The resins were Plexar® PX3236 anhydride modified linear low density polyethylene and Plexar® PX165 anhydride modified low density polyethylene, both obtained from Quantum chemical company. Pyrolysis gas chromatography-mass spectrometry (GC-MS) was employed for the quantitation of maleic anhydride in PX3236 and PX165 resins. Total maleic anhydride content was as follows:

| Resin Identity | Maleic Anhydride Content (ppm) |
|---|---|
| PX3236 | 190 |
| PX165 | 141 |

In the pyrolysis GC-MS analysis, for each resin, a 10 mg specimen was placed into a quartz tube and secured with silane treated glass wool. The quartz tube was inserted into a CDS Analytical Pyroprobe 2000 coil probe. The probe was placed into a heated interface (280° C.) and resin pyrolyzed at 700° C. for 10 seconds in an inert atmosphere. The volatiles from the resins were collected on a Tenax trap at 40 mL/min. After 10 seconds, the contents of the trap were thermally desorbed onto the GC-MS. Conditions were as shown below:

| Analysis Parameter | Description |
|---|---|
| Instrument | HP 5890 with HP5971A Mass Spectrometric Detector |
| Carrier | Helium at 0.6 mL/min, 10:1 split |
| Column | J&W DB-35 ms, 30 meters × 0.25 mm i.d., 0.25 μm film thickness |
| Injector Temperature | 250° C. |
| Temperature Program | 35° C. for 2 min, then ramp to 300° C. at 10° C./min and held for 5 min |
| Detector Temperature | 280° C. |
| Desorption Program | 40° C. to 250° C. at 40° C./min, 6 minute desorption time |
| Cryotrap | −120° C. for 6.5 minutes, then rapidly heated to 230° C. |
| Mass Spectrometer | Sim mode monitoring ions 54 and 98 for maleic anhydride at 100 msec dwell at each ion |

The concentration of maleic anhydride in the resins was determined by comparison of the results obtained with known standards of maleic anhydride in methanol which were analyzed along with the Plexar® resins.

If desired or necessary, various additives are also included with the films. For example, additives comprise pigments, colorants, fillers, antioxidants, flame retardants, anti-bacterial agents, anti-static agents, stabilizers, fragrances, odor masking agents, anti-blocking agents, slip agents, nucleating agents, and the like. Thus, the present invention encompasses employing suitable film constituents.

Figure 2:
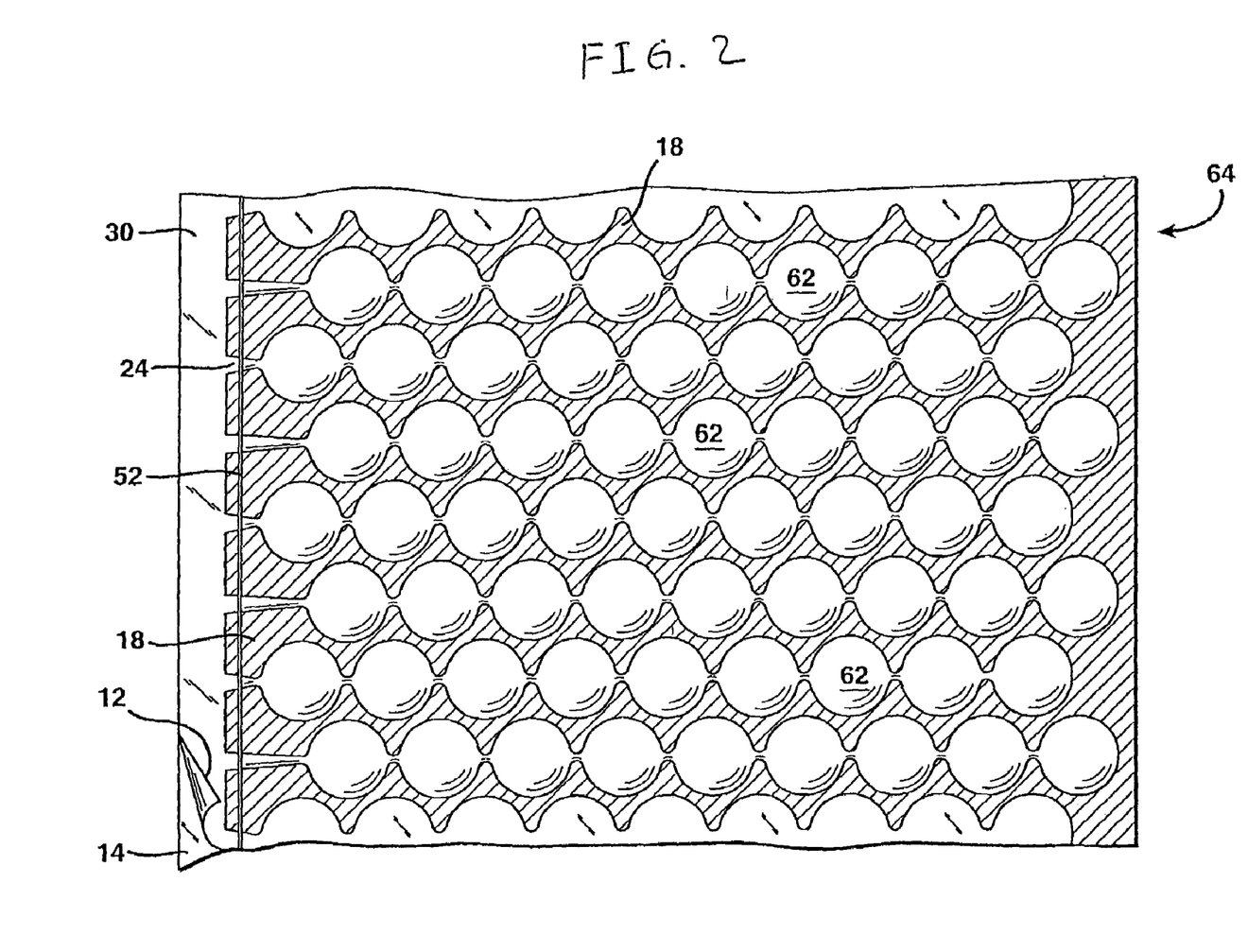
FIG. 2 is a perspective view of the article of FIG. 1 after inflation.
Figure 3:
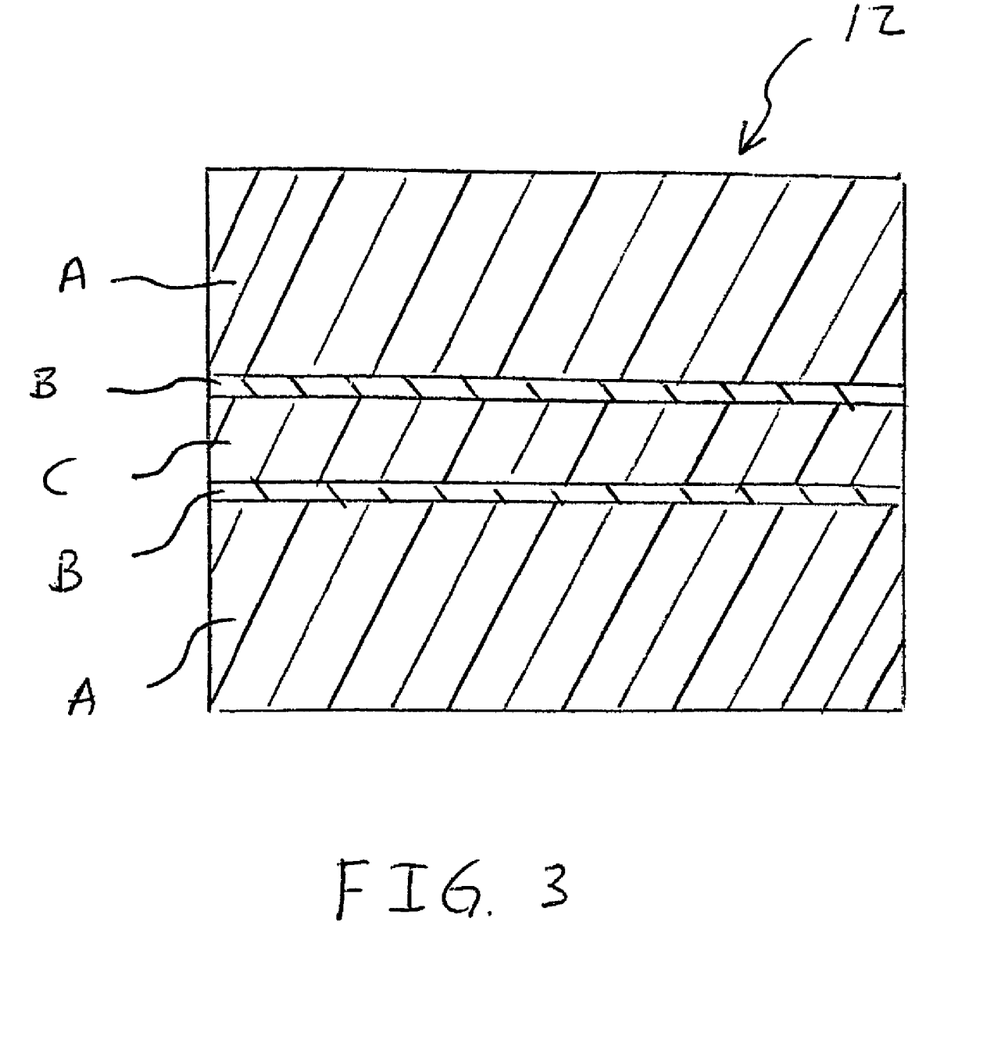
FIG. 3 is an enlarged cross-sectional schematic view of a preferred multilayer film for use in the inflatable article of the present invention.

FIG. 3 illustrates a cross-sectional view of a preferred multilayer film for use as films 12 and 14 in FIGS. 1 and 2. Referring to FIG. 3, there is shown a cross-sectional view of film 12 having A/B/C/B/A structure, film 12 having a total thickness of 1.6 mils.

The A layers were each seal layers, and each make up 43 percent of the total thickness of the film. Each of the A layers were a blend of 45% by weight HCX002 linear low density polyethylene having a density of 0.941 g/cc and a melt index of 4, obtained from Mobil, 45% by weight LF10218 low density polyethylene having a density of 0.918 g/cc and a melt index of 2, obtained from Nova, and 10% by weight SLX9103 metallocene-catalyzed ethylene/butene/hexene terpolymer, obtained from Exxon.

The B layers were each tie layers, and each make up 2% of the total thickness of film 12. Each of the B layers were tie layers made of 100% Plexar® PX3236 anhydride modified linear low density polyethylene copolymer, obtained from Qunatum Chemical. A pyrolysis analysis of Plexar® PX3236 resulted in a determination of the presence of anhydride at a level of 190 ppm, based on resin weight.

The C layer was a gas barrier layer, and makes up 10% of the total thickness of film 12. The C layer was a gas barrier layer of 100% Caplon® B100WP polyamide 6 having a viscosity of FAV=100, obtained from Allied Chemical.

Figure 4:
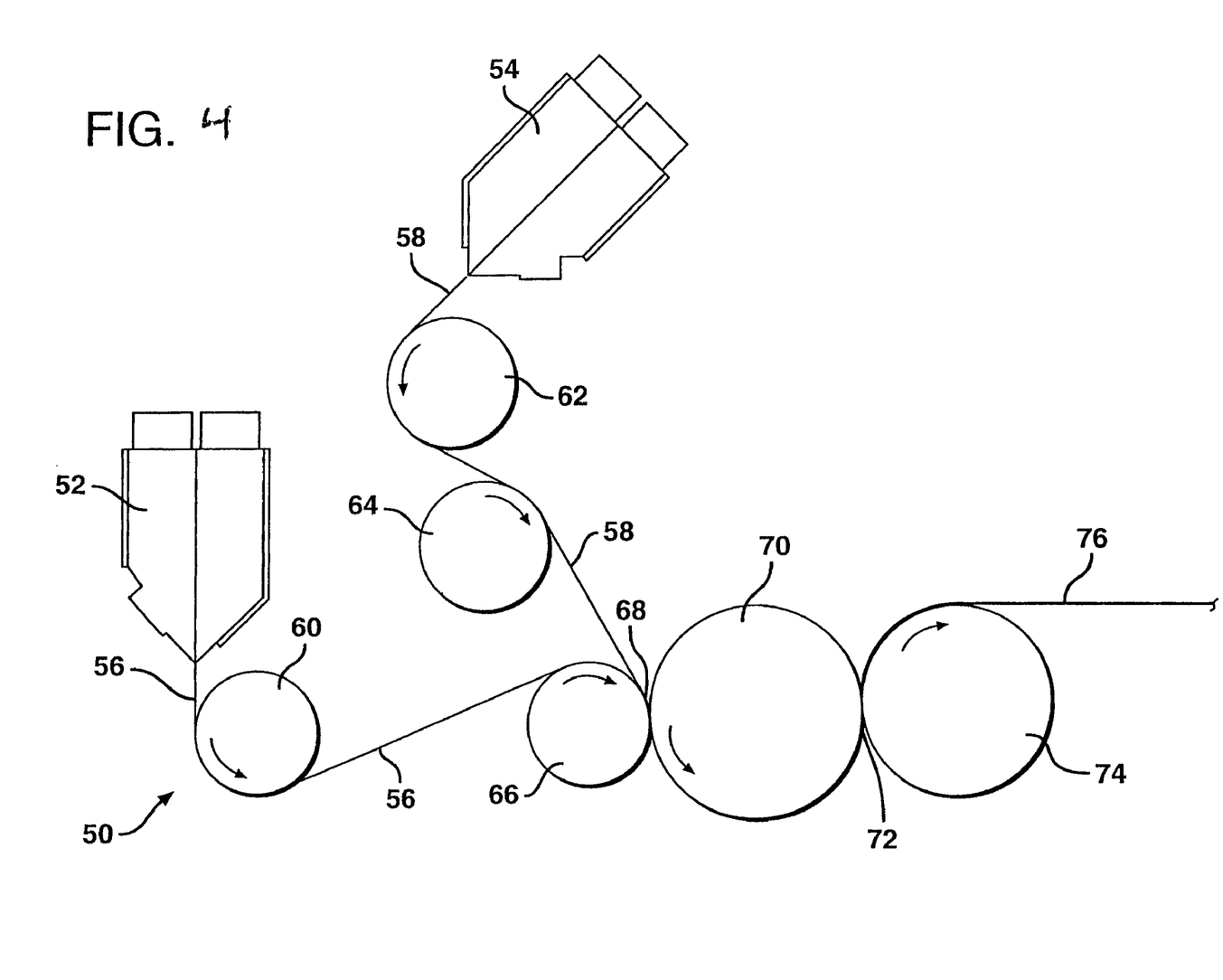
FIG. 4 is a schematic of a preferred process for making the inflatable article.

FIG. 4 is a schematic of a particularly preferred apparatus and process 50 for making the inflatable cushioning article of the present invention. In FIG. 4, extruders 52 and 54 extrude first film 56 and second film 58, respectively, from slot dies, as shown. After extrusion, film 56 makes a partial wrap around heat transfer (cooling) roller 60, lo which preferably has a diameter of 8 inches and which is maintained at a surface temperature well beneath the fusion temperature of the extrudate, e.g., from 100–150° F. Second film 58 makes a partial wrap around each of heat transfer (cooling) rollers 62 and 64, each of which has a diameter of 8 inches and each of which is maintained at a surface temperature similar to that of cooling roller 60. After cooling, first film 56 makes a partial wrap (about 90 degrees) around Teflon® coated rubber nip roll 66, which has a diameter of 8 inches and which has, as its primary function, maintaining nip with heat transfer (heating) raised surface roll 70. While first film 56 is passing over nip roll 66, second film 58 merges with first film 56, with both films together being wrapped for a short distance around nip roll 66 before together entering first nip 68. Nip roller 66 provides a location of films 56 and 58 to come together without being marred or distorted.

Thereafter, second film 58 makes direct contact with raised surface roll 70 (which is illustrated as a smooth roll only for simplicity of illustration). First nip 68 subjects films 56 and 58 to a pressure of from 2 to 10 pounds per linear inch, preferably 2 to 6 pounds per linear inch, more preferably about 4 pounds per linear inch.

Films 56 and 58 together contact raised surface roll 70 for a distance of about 180 degrees. Raised surface roll 70 has a diameter of 12 inches, is heated by circulating hot oil therethrough so that the surface is maintained at a temperature of from 280° F. to 350° F., and has edges of the raised surfaces being rounded over to a radius of $\frac{1}{64}$ inch. Raised surface roll 70 has a Teflon® polytetrafluoroethylene coating thereon, with the raised surfaces being above the background by a distance of $\frac{1}{4}$ inch (0.64 cm). Moreover, the raised surface of raised surface roll 70 is provided with a surface roughness of from 50 to 500 root mean square (i.e., "rms"), preferably 100 to 300 rms, more preferably about 250 rms. This degree of roughness improves the release qualities of raised surface roll 70, enabling faster process speeds and a high quality product which is undamaged by licking back on roll 70.

The raised surface heats that portion of film 58 which contacts the raised surface of roll 70. Heat is transferred from raised surface roll 70, through a heated portion of film 58, to heat a corresponding portion of film 56 to be heat sealed to film 58. Upon passing about 180 degrees around raised surface roll 70, heated films 58 and 56 together pass through second nip 72, which subjects heated films 58 and 56 to about the same pressure as is exerted in first nip 68, resulting in a patterned heat seal between films 56 and 58.

After passing through second nip 72, films 58 and 56, now sealed together, pass about 90 degrees around heat transfer (cooling) roller 74, which has a diameter of 12 inches and which has cooling water passing therethrough, the cooling water having a temperature of from 100° F. to 150° F. Cooling roller 74 has a $\frac{1}{4}$ inch thick (about 0.64 cm thick) release and heat-transfer coating thereon. The coating is made from a composition designated "SA-B4", which is provided and applied to a metal roller by Silicone Products and Technologies Inc of Lancaster, N.Y. The coating contains silicone rubber to provide cooling roller 74 with a Shore A hardness of from 40 to 100, preferably 50–80, more preferably 50–70, and still more preferably about 60. The SA-B4 composition also contains one or more fillers to increase the heat conductivity to improve the ability of cooling roller 74 to cool the still hot films, now sealed together to result in inflatable article 10, which is thereafter rolled up to form a roll for shipment and subsequent inflation and sealing, to result in a cushioning article.

In order to carry out the process at relatively high speed, e.g., speeds of at least 120 feet per minute, preferably from 150 to 300 feet per minute, but up to as high as 500 feet per minute, it has been found to be important to provide the manufacturing apparatus with several features. First, the raised surface roll should be provided with a release coating or layer, and to also avoid sharp edges which interfere with a clean release of the film from the raised surface roll. As used herein, the phrase "release coating" is inclusive of all release coatings and layers, including polyinfused coatings, applied coatings such as brushed and sprayed coatings which cure on the roll, and even a release tape adhered to the roll. A preferred release coating composition is Teflon® polytetrafluoroethylene. Second, the edges of the raised surfaces should be rounded off to a radius large enough that the film readily releases without snagging on an edge due to its "sharpness" relative to the softened film. Preferably, the radius of curvature is from $\frac{1}{256}$ inch to $\frac{3}{8}$ inch, more preferably from $\frac{1}{128}$ inch to $\frac{1}{16}$ inch, more preferably from $\frac{1}{100}$ inch to $\frac{1}{32}$ inch, and more preferably about $\frac{1}{64}$ inch, i.e., about 0.04 cm. It is also important to provide the cooling roller downstream of and in nip relationship with the raised surface roller, with a release coating or layer, as described above.

The cooling roller lowers the temperature of the selected heated portions of the laminate, in order to cool the heat seals so that they become strong enough to undergo further processing without being damaged or weakened. Moreover, the cooling means is preferably immediately downstream of the heating means (i.e., the raised surface roll), in order to reduce heat seepage from the still-hot seals to unheated portions of film, to prevent unheated portions of laminated article from becoming hot enough to fuse the films in an area intended to serve as an inflation chamber or inflation passageway.

Preferably, the films used to make the inflatable article are blown or cast films. Blown films, also referred to as hot blown films, are extruded upwardly from an annular die, and are oriented in the lengthwise and transverse directions while still molten, by blowing the annular extrudate into a bubble (transverse orientation) and drawing on the bubble at a faster rate that the rate of extrusion (machine direction orientation). However, a preferred method of making the film for use in the present invention is a cast extrusion process in which molten polymer is extruded through a slot die, with the extrudate contacting a chilled roll shortly after extrusion. Both hot blown films and cast films have a total free shrink (i.e., machine direction free shrink plus transverse free shrink) at 185° F. of less than 15 percent as measured by ASTM D 2732, more preferably, less than 10 percent.

The films from which the inflatable cellular cushioning article are made are thick enough to provide the inflatable article with adequate strength and durability, but thin enough to minimize the amount of resin necessary. If the maximum dimension of the cells is from 1 to 3 inches, preferably each of the films has a thickness of from 0.1 to 20 mils, more preferably, from 0.5 to 10 mils, more preferably from 0.5 to 4 mils, more preferably 0.5 to 3 mils, more preferably from 1 to 3 mils, more preferably, from 1 to 2 mils, and more preferably about 1.6 mils. As the films do not have an entirely uniform thickness, they can also be described as having a unit weight of from 20 to 70 grams/square meter, more preferably 25 to 65 gms/square meter, more preferably 30 to 60 gms/square meter, more preferably 30 to 50 gms/square meter, more preferably 30 to 45 gms/square meter, and more preferably about 38 grams/square meter.

EXAMPLE NO. 1

A first inflatable article was made and aged in accordance with the process of the present invention. The process was carried out by extruding, cooling, heat sealing, cooling, winding up, and aging two multilayer films in an integrated process as illustrated in FIG. 4, described above. Each film had the same A/B/C/B/A structure as generally illustrated in FIG. 3, with each film having a unit weight of 42.5 grams per 12 square feet, each film having an average thickness of about 1.6 mils. The layer arrangements, thicknesses, and compositions of the various layers of each of the films is set forth below:

| Layer Identity | Thickness of Each Layer (% of Total Film Thickness) | Layer Composition |
| --- | --- | --- |
| A Seal layer | 40.5 | Blend of 41.5 wt % HCX002 linear low density polyethylene, 41.5 wt. % LF10218 low density polyethylene, and 15% by weight Dow Elite 5100 resin |
| B Tie layer | 2 | 100 wt. Percent Plexar ® PX3236 anhydride modified linear low density polyethylene copolymer (having an anhydride level of 190 ppm) |
| C Barrier layer | 5 | 100% CAPRON ® B135WP polyamide 6 |

The resulting inflatable article was made by sealing in the pattern illustrated in FIG. 1, and when inflated after aging had an appearance in accordance with FIG. 2. The inflatable article had a lay flat (uninflated) width of 15.5 inches. Each chamber consisted of an inflation port and 7 cells in series, each cell being circular in shape and having a lay flat diameter of 1.75 inches, i.e., before inflation. The channels between the cells had a lay flat width of 0.6 inches.

The inflatable article was taken immediately from the manufacturing area and aged at a temperature of 140° F. for 2 hours, immediately following which the inflatable article was normalized by being placed in a 23° C. 50% relative humidity environment for 20 minutes, with the Burst Pressure Test being carried out on the article at the end of the 20 minute period, while the article remained in the 23° C., 50% relative humidity environment. The burst test result is provided in a table below which follows the various examples.

COMPARATIVE EXAMPLE NO. 1

An inflatable article was made precisely in accordance with Example No. 1, but immediately upon completion of the manufacturing process, the resulting inflatable article was not allowed to age, but instead was immediately taken from the manufacturing process area and placed in a 23° C. 50% relative humidity environment for 20 minutes, with the Burst Pressure Test being carried out on the article at the end of the 20 minute period, while the article remained in the 23° C., 50% relative humidity environment. Otherwise, the Burst Pressure Test was carried out in precisely the same manner as for the inflatable article of Example No. 1. The burst pressure test result is provided in the table below.

The Burst Pressure Test

Figure 5:
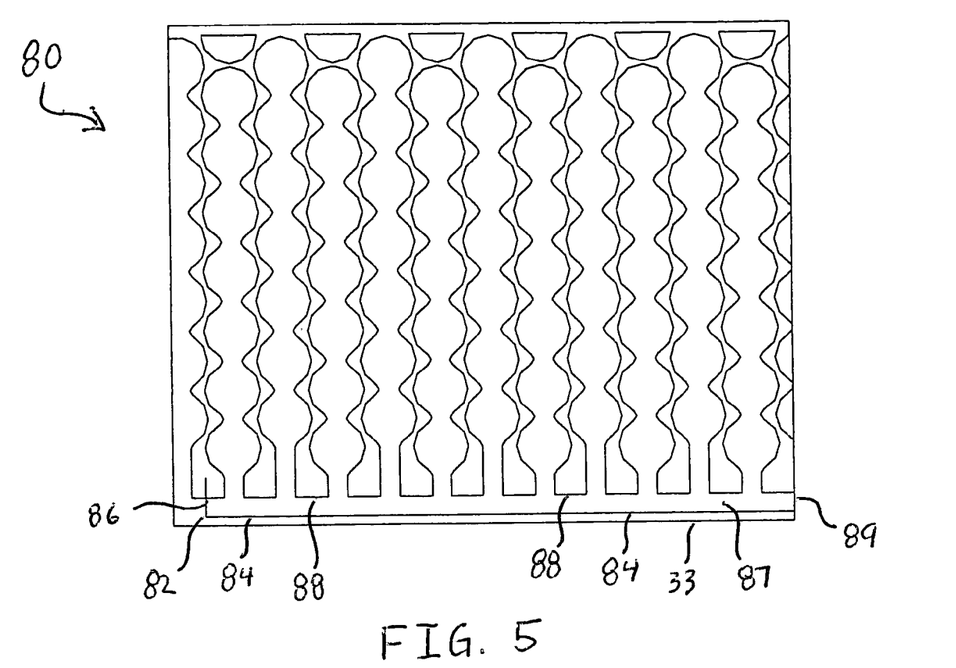
FIG. 5 is a lay-flat view of a section of inflatable article which has been modified for conducting a burst test.
Figures 6A, 6C:
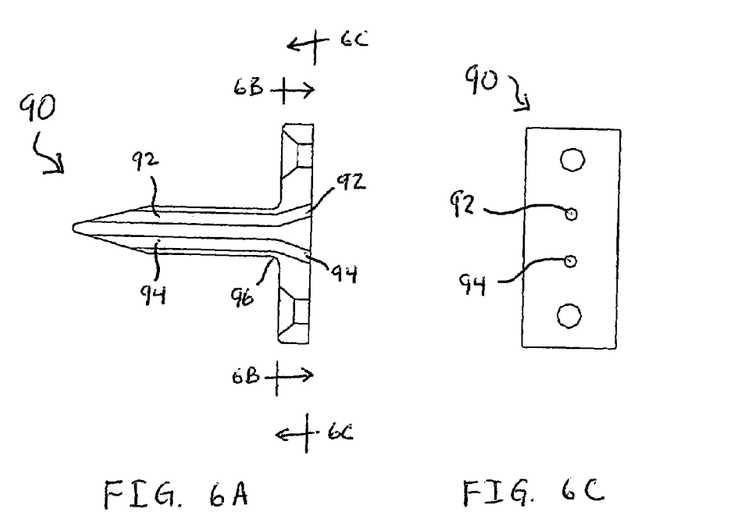
FIG. 6A is a longitudinal sectional view of an inflation nozzle to be used in the burst test.
FIG. 6C is a cross-sectional view of the inflation nozzle of FIG. 6A, taken through line 6C—6C of FIG. 6A.
Figure 6B:
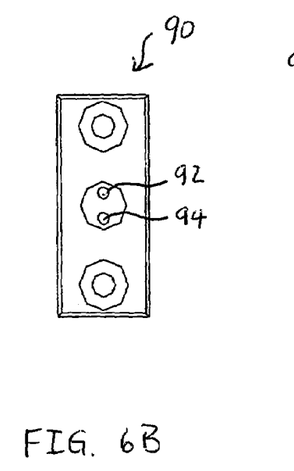
FIG. 6B is a cross-sectional view of the inflation nozzle of FIG. 6A, taken through line 6B—6B of FIG. 6A.

The Burst Pressure Test was carried out on a section of the inflatable article 80 which was modified with additional seal 82, as shown in FIG. 5. Seal 82 is a heat seal, and is made up of longitudinal heat seal portion 84 and transverse heat seal portion 86. Longitudinal seal portion 84 runs parallel to edge 33, and is spaced a desired distance from seal edges 88 to provide inflation passageway 87, so that inflation nozzle 90 (see FIGS. 6A, 6B, and 6C) can be inserted and fit snugly against the inside surface thereof. Inflation nozzle 90 has mirror-image passageways 92 and 94 therewithin, with one passageway being connected to a source of compressed air, while the other is connected to a pressure gauge. Passageways 92 and 94 each have a diameter of 3/32 inch. Inflation nozzle 90 is inserted into passageway 87 until inflation nozzle base portion 96 contacts film edge 89. Then clamp 100 (see FIG. 7) is placed over that portion of the film around passageway 87 which covers cylindrical portion 98 of inflation nozzle 90. Cylindrical portion 98 has a diameter of 3/8 inch.

Figure 7A:
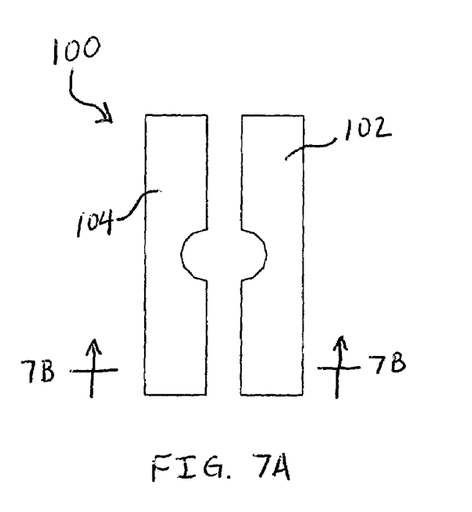
FIG. 7A is a longitudinal view of a pair of clamp cauls used to clamp the inflatable article to the inflation nozzle of FIGS. 6A, 6B, and 6C.
Figure 7B:
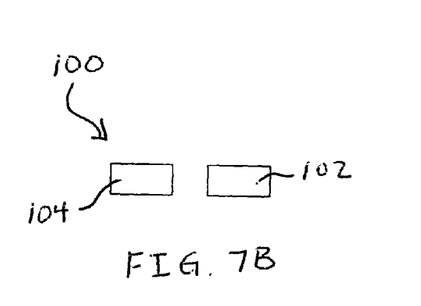
FIG. 7B is a cross-sectional view of the clamping cauls of FIG. 7A, taken through line 7B—7B of FIG. 7A.
Figure 8A:
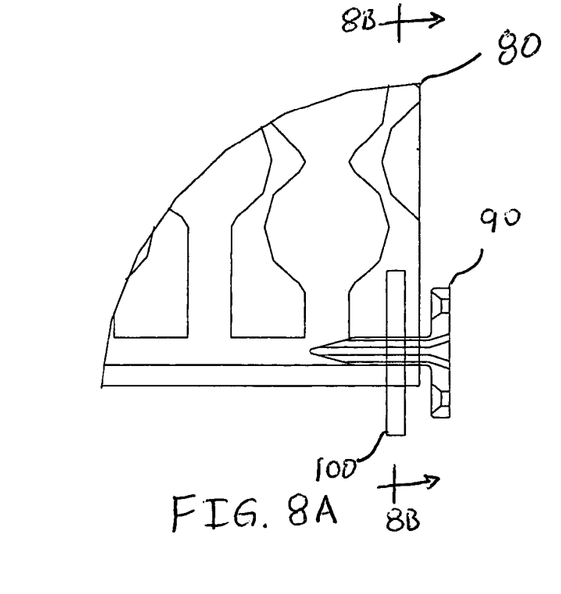
FIG. 8A is a detail view of an assembly which includes that portion of the modified inflatable article which contains the inflation nozzle and the clamping cauls.
Figure 8B:
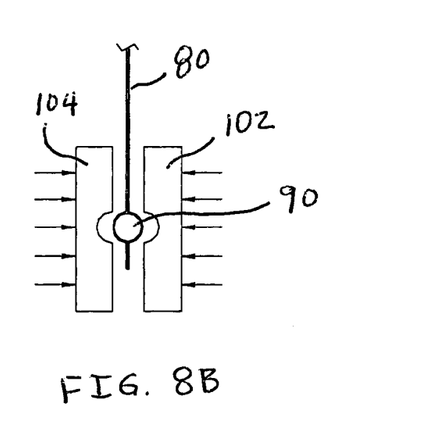
FIG. 8B is a schematic cross-sectional view of the assembly of FIG. 8A.

As shown in FIGS. 7A and 7B, clamp cauls 100, which comprise upper clamp caul 102 and lower clamp caul 104, are used to hold the films of inflatable article 80 firmly against inflation nozzle 90, in the position illustrated in FIGS. 8A and 8B. The device for applying force to hold clamping cauls 100 firmly against inflation nozzle 90 is not illustrated, but can be any means known to those of skill in the art, such as a C-clamp, bar clamp, spring clamp, hydraulic clamp, etc. When forced firmly against film 80 as illustrated in FIGS. 8A and 8B, clamping cauls 100 reduce or eliminate backflow of compressed air past inflation nozzle 90 and out of passageway 87. It should be noted that transverse seal portion 86 serves to provide a closed end to passageway 87, so that upon addition of compressed air from inflation nozzle 90, eleven chambers were simultaneously inflated until the article burst.

During the Burst Pressure Test, compressed air was provided to the inflation nozzle at 20 psi, using a pressure regulator, with airflow being controlled by a throttling device (e.g., orifice, needle valve, etc) to 0.2 standard cubic feet per minute at free flow. The test was carried out while the inflatable article was at 23° C. and while the ambient pressure surrounding the inflatable article was 1 atmosphere.

When the inflatable article ruptured, the peak pressure was recorded. The inflatable article of the Example reached a pressure of about 8 to 9 psi before bursting. In contrast, the inflatable article of the Comparative Example reached a pressure of from about 5 to 6 psi before bursting.

EXAMPLE NO. 2

A second inflatable article was produced, aged, and tested in accordance with the process of the present invention, as described above in Example No. 1, above. However, in Example No. 2, the second inflatable article was made by extruding two films each of which had a barrier layer which made up 10 percent of the total thickness of the film, rather than the 5 percent total film thickness for the barrier layer of each of the films utilized in Example No. 1. In Example No. 2, Each film had a unit weight of 42.5 grams per 12 square feet, each film having an average thickness of about 1.6 mils. The layer arrangements, thicknesses, and compositions of the various layers of each of the films is set forth below:

| Layer Identity | Thickness of Each Layer (% of Total Film Thickness) | Layer Composition |
|---|---|---|
| A | 43 | Blend of 41.5 wt % HCX002 linear low density polyethylene, 41.5 wt. % LF10218 low density polyethylene, and 15% by weight Dow Elite 5100 resin |
| B | 2 | 100 wt. % Plexar ® PX3236 anhydride modified linear low density polyethylene copolymer (having an anhydride level of 190 ppm) |
| C | 10 | 100 wt. % CAPRON ® B135WP polyamide 6 |

The resulting inflatable article was made by sealing and aging in the same manner described in Example No. 1, with the inflated article having an appearance, lay-flat width, chamber, and cell size, arrangement, and shape otherwise in accordance with Example No. 1. The burst test result is provided in the table below, following the examples.

COMPARATIVE EXAMPLE NO. 2

An inflatable article was made precisely in accordance with Example No. 2, but immediately upon completion of the manufacturing process, the resulting inflatable article was not allowed to age, but instead was immediately taken from the manufacturing process area and placed in a 23° C. 50% relative humidity environment for 20 minutes, with the Burst Pressure Test being carried out on the article at the end of the 20 minute period, while the article remained in the 23° C., 50% relative humidity environment. Otherwise, the Burst Pressure Test was carried out in precisely the same manner as for the inflatable article of Example No. 2.

EXAMPLE NO. 3

A third inflatable article was produced, age, and tested in accordance with the process of the present invention, as described above in Example No 1, above. However, the third inflatable article was made by extruding two films each of which had a barrier layer which made up 15 percent of the total thickness of the film, rather than the 5 percent total film thickness for the barrier layer of each of the films utilized in Example No. 1. Each of the films had a unit weight of 42.5 grams per 12 square feet, and each film had an average thickness of about 1.6 mils. The layer arrangements, thicknesses, and compositions of the various layers of each of the films is set forth below:

| Layer Identity | Thickness of Each Layer (% of Total Film Thickness) | Layer Composition |
|---|---|---|
| A | 40.5 | Blend of 41.5 wt % HCX002 linear low density polyethylene, 41.5 wt. % LF10218 low density polyethylene, and 15% by weight Dow Elite 5100 resin |
| B | 2 | 100 wt. % Plexar ® PX3236 anhydride modified linear low density polyethylene copolymer (having an anhydride level of 190 ppm) |
| C | 15 | 100 wt. % CAPRON ® B135WP polyamide 6 |

The resulting inflatable article was made by sealing and aging in the same manner described in Example No. 1, with the inflated article having an appearance, lay-flat width, chamber, and cell size, arrangement, and shape otherwise in accordance with Example No. 1. The burst test result is provided in the table below, following the examples.

COMPARATIVE EXAMPLE NO. 3

An inflatable article was made precisely in accordance with Example No. 3, but immediately upon completion of the manufacturing process, the resulting inflatable article was not allowed to age, but instead was immediately taken from the manufacturing process area and placed in a 23° C. 50% relative humidity environment for 20 minutes, with the Burst Pressure Test being carried out on the article at the end of the 20 minute period, while the article remained in the 23° C., 50% relative humidity environment. Otherwise, the Burst Pressure Test was carried out in precisely the same manner as for the inflatable article of Example No. 1.

| | WEIGHT PERCENT NYLON 6 | BURST PRESSURE BEFORE AGING (psi) | BURST PRESSURE AFTER AGING (psi) | INCREASE IN BURST PRESSURE WITH AGING |
|---|---|---|---|---|
| Example No. 1 | 5 | — | 7.8 | 13% |
| Comparative No. 1 | 5 | 6.9 | — | — |
| Example No. 2 | 10 | — | 8.2 | 17.1% |
| Comparative No. 2 | 10 | 7 | — | — |
| Example No. 3 | 15 | — | 8.8 | 18.9% |
| Comparative No. 3 | 15 | 7.4 | — | — |

The results of the various examples and comparative examples set forth above demonstrate the increased burst strength of the inflatable articles aged in accordance with the present invention. When inflated to relatively high internal pressure, aging resulted in an article capable of higher burst pressure (versus un-aged article). Higher burst pressure correlates with the ability to withstand more extreme conditions without bursting.

In the figures and specification, there have been disclosed preferred embodiments of the invention. All sub-ranges of all ranges disclosed are included in the invention and are hereby expressly disclosed. Those skilled in the art will appreciate that numerous changes and modifications may be made to the embodiments described herein, and that such changes and modifications may be made without departing from the spirit of the invention.

What is claimed is:

1. A process for making an inflated cellular cushioning article, comprising:
    (A) extruding a first multilayer film having an outer heat seal layer, a tie layer, and a gas barrier layer comprising at least one member selected from the group consisting of crystalline polyamide, crystalline polyester, ethylene/vinyl alcohol copolymer, polyacrylonitrile, and crystalline polycycloolefin, wherein the tie layer comprises an anhydride modified olefin polymer containing anhydride at a level of at least 150 ppm, based on the weight of the modified olefin polymer;
    (B) extruding a second multilayer film having an outer heat seal layer, a tie layer, and a gas barrier layer comprising at least one member selected from the group consisting of crystalline polyamide, crystalline polyester, ethylene/vinyl alcohol copolymer, polyacrylonitrile, and crystalline polycycloolefin, wherein the tie layer comprises an anhydride modified olefin polymer containing anhydride at a level of at least 150 ppm, based on the weight of the modified olefin polymer;
    (C) heating selected portions of at least one of the first multilayer film and the second multilayer film to a temperature above a fusion temperature, so that the first and second multilayer films are heat sealed to one another at a selected area, with the selected area providing a heat seal pattern which leaves inflatable chambers between the first film and the second film, whereby an inflatable cellular cushioning article is produced;
    (D) aging at least one member selected from the group consisting of the first multilayer film and the second multilayer film, the aging being carried out before inflating the inflatable cellular cushioning article, and for a time and at a temperature in accordance with at least one member selected from the group consisting of:
        (i) 141° F. to 250° F. for a period of at least 1 second;
        (ii) 101° F. to 140° F. for a period of at least 10 minutes;
        (iii) 61° F. to 100° F. for a period of at least 1 hour; and
        (iv) 30° F. to 60° F. for a period of at least 1 day;
    (E) inflating the cellular cushioning article after aging.

2. The process according to claim 1, wherein the aging is carried out before the heating of the selected portions to the temperature above the fusion temperature.

3. The process according to claim 2, wherein both the first multilayer film and the second multilayer film are aged before the heating of the selected portions to the temperature above the fusion temperature.

4. The process according to claim 1, wherein the inflatable cellular cushioning article is aged after the heating of the selected portions to the temperature above the fusion temperature.

5. The process according to claim 4, wherein the inflatable cellular cushioning article is aged for a time and at a temperature in accordance with at least one member selected from the group consisting of:
    (i) 141° F. to 250° F. for a period of from 1 second to 1 day;
    (ii) 101° F. to 140° F. for a period of from 10 minutes to 10 days;
    (iii) 61° F. to 100° F. for a period of from 1 hour to 100 days; and
    (iv) 30° F. to 60° F. for a period of from 1 day to 1 year.

6. The process according to claim 5, wherein the inflatable cellular cushioning article is aged for a time and at a temperature in accordance with at least one member selected from the group consisting of:
    (i) 141° F. to 250° F. for a period of from 1 second to 2 hours;
    (ii) 101° F. to 140° F. for a period of from 30 minutes to 6 days;
    (iii) 61° F. to 100° F. for a period of from 1 day to 10 days; and
    (iv) 30° F. to 60° F. for a period of from 3 days to 60 days.

7. The process according to claim 1, wherein the gas barrier layer of the first multilayer film comprises at least one member selected from the group consisting of crystalline polyamide, crystalline polyester, ethylene/vinyl alcohol copolymer, polyacrylonitrile, and crystalline polycycloolefin, in an amount of from 3 to 30 percent, based on total film weight, and the gas barrier layer of the second multilayer film comprises at least one member selected from the group consisting of crystalline polyamide, crystalline polyester, ethylene/vinyl alcohol copolymer, polyacrylonitrile, and crystalline polycycloolefin, in an amount of from 3 to 30 percent, based on total film weight.

8. The process according to claim 7, wherein the gas barrier layer of the first multilayer film comprises crystalline polyamide in an amount of from 5 to 20 percent, based on total film weight, and the gas barrier layer of the second multilayer film comprises crystalline polyamide in an amount of from 5 to 20 percent, based on total film weight.

9. The process according to claim 8, wherein the gas barrier layer of the first multilayer film comprises crystalline polyamide in an amount of from 8 to 15 percent, based on total film weight, and the gas barrier layer of the second multilayer film comprises crystalline polyamide in an amount of from 8 to 15 percent, based on total film weight.

10. The process according to claim 1, wherein the tie layer of the first multilayer film comprises an anhydride modified ethylene/$C_{4-10}$ alpha-olefin copolymer, and the tie layer of the second multilayer film comprises an anhydride modified ethylene/$C_{4-10}$ alpha-olefin copolymer.

11. The process according to claim 10, wherein the tie layer comprises an anhydride modified ethylene/$C_{4-8}$ copolymer having an anhydride content of at least 160 ppm as determined by pyrolysis GCMS.

12. The process according to claim 10, wherein the anhydride modified polyolefin comprises anhydride modified linear low density polyethylene having an anhydride content of at least 180 ppm as determined by pyrolysis GCMS.

13. The process according to claim 1, wherein the seal layer of the first multilayer film comprises at least one member selected from the group consisting homogeneous ethylene/alpha-olefin copolymer, very low density polyethylene, low density polyethylene, and linear low density polyethylene, and the seal layer of the second multilayer film comprises at least one member selected from the group consisting homogeneous ethylene/alpha-olefin copolymer, very low density polyethylene, low density polyethylene, and linear low density polyethylene.

14. The process according to claim 1, wherein the first multilayer film has first and second outer layers, a central gas barrier layer, a first tie layer between the first outer layer and the gas barrier layer, and a second tie layer between the gas barrier layer and the second outer layer.

15. The process according to claim 14, wherein the second multilayer film has first and second outer layers, a central gas barrier layer, a first tie layer between the first outer layer and the gas barrier layer, and a second tie layer between the gas barrier layer and the second outer layer.

16. The process according to claim 15, wherein:
the first and second outer layers of the first multilayer film have the same layer thickness and have the same polymeric composition, and the first and second tie layers of the first film have the same layer thickness and the same polymeric composition; and
the first and second outer layers of the second film have the same layer thickness and have the same polymeric composition, and the first and second tie layers of the second film have the same layer thickness and the same polymeric composition.

17. The process according to claim 16, wherein the first film has a thickness of from 1 mil to 2 mils and the second film has a thickness of from 1 mil to 2 mils.

18. The process according to claim 1, wherein the first and second multilayer films are sealed together to form both the chambers and an inflation manifold, with the inflation manifold extending along a machine direction of the inflatable cushioning article.

19. The process according to claim 1, wherein the chambers extend transversely from an open skirt which extends along a machine direction.

20. The process according to claim 1, wherein each chamber comprises from 3 to 40 cells.

21. The process according to claim 20, wherein each cell has a major uninflated axis having a length of from 0.5 inch to 2.5 inches.

22. A process for making an inflated cellular cushioning article, comprising:
(A) extruding a first multilayer film having an outer heat seal layer, a tie layer, and a gas barrier layer which comprises at least one member selected from the group consisting of crystalline polyamide, crystalline polyester, ethylene/vinyl alcohol copolymer, polyacrylonitrile, and crystalline polycycloolefin, wherein the tie layer comprises an anhydride modified olefin polymer containing anhydride at a level of at least 150 ppm, based on the weight of the anhydride modified olefin polymer;
(B) extruding a second multilayer film having an outer heat seal layer, a tie layer, and a gas barrier layer which comprises at least one member selected from the group consisting of crystalline polyamide, crystalline polyester, ethylene/vinyl alcohol copolymer, polyacrylonitrile, and crystalline polycycloolefin, wherein the tie layer comprises an anhydride modified olefin polymer containing anhydride at a level of at least 150 ppm, based on the weight of the modified olefin polymer;
(C) heating selected portions of at least one of the first multilayer film and the second multilayer film to a temperature above a fusion temperature, so that the first and second films are heat sealed to one another at a selected area, with the selected area providing a heat seal pattern which leaves inflatable chambers between the first film and the second film, whereby an inflatable cellular cushioning article is produced;
(D) aging the inflatable cellular cushioning article for a time and at a temperature so that the inflatable cellular cushioning article has a burst strength after aging which is at least 5 percent higher than the burst strength of the article before aging.

23. The process according to claim 22, wherein the inflatable cellular cushioning article has a burst strength immediately after aging which is at least 10 percent higher than the burst strength of the article immediately before aging.

24. The process according to claim 22, wherein the inflatable cellular cushioning article has a burst strength immediately after aging which is at least 15 percent higher than the burst strength of the article immediately before aging.

25. A process for making an inflated cellular cushioning article, comprising:
(A) extruding a multilayer film having an outer heat seal layer, a tie layer, and a gas barrier layer comprising at least one member selected from the group consisting of crystalline polyamide, crystalline polyester, ethylene/vinyl alcohol copolymer, polyacrylonitrile, and crystalline polycycloolefin, wherein the tie layer comprises an anhydride modified olefin polymer containing anhydride at a level of at least 150 ppm, based on the weight of the modified olefin polymer, the first film being folded over so that a first portion of the multilayer film overlaps a second portion of the multilayer film;
(B) heating selected portions of the multilayer film to a temperature above a fusion temperature, so that the first portion of the multilayer film is heat sealed to the second portion of the multilayer film in a selected area, with the selected area providing a heat seal pattern which leaves inflatable chambers between the first film and the second film, whereby an inflatable cellular cushioning article is produced;
(C) aging the multilayer film, the aging being carried out before inflating the inflatable cellular cushioning article, the aging being for a time and at a temperature in accordance with at least one member selected from the group consisting of:
(i) 141° F. to 250° F. for a period of at least 1 second;
(ii) 101° F. to 140° F. for a period of at least 10 minutes;
(iii) 61° F. to 100° F. for a period of at least 1 hour; and
(iv) 30° F. to 60° F. for a period of at least 1 day;
(E) inflating the cellular cushioning article after aging.

26. The process according to claim 25, wherein the film is extruded from an annular die.

27. The process according to claim 25, wherein the film is extruded from a slot die and is folded over.

* * * * *